United States Patent [19]

Stacey et al.

[11] Patent Number: 5,176,857
[45] Date of Patent: Jan. 5, 1993

[54] METHOD OF PRODUCING INORGANIC OXIDE FIBERS WITH AXIALLY ALIGNED POROSITY

[75] Inventors: Martin H. Stacey, Northwich; Michael D. Taylor, Great Barrow, both of England

[73] Assignee: Imperial Chemical Industries PLC, London, England

[21] Appl. No.: 708,846

[22] Filed: May 30, 1991

Related U.S. Application Data

[62] Division of Ser. No. 274,771, Nov. 23, 1988, abandoned.

[30] Foreign Application Priority Data

Nov. 23, 1987 [GB] United Kingdom ............ 8727410

[51] Int. Cl.⁵ .................. B29B 9/00; B29C 65/00; B29C 47/88
[52] U.S. Cl. .................. 264/14; 264/44; 264/204; 264/211.11; 264/211.12
[58] Field of Search .......... 264/44, 43, 56, 5, 13, 264/14, 204, 211, 211.11, 211.12; 501/95, 80, 81, 82

[56] References Cited

U.S. PATENT DOCUMENTS

| | | | |
|---|---|---|---|
| 3,846,527 | 11/1974 | Winter et al. | 264/63 |
| 3,853,688 | 12/1974 | D'Ambrosio | 501/95 X |
| 3,950,478 | 4/1976 | Kenworthy et al. | 264/234 |
| 3,953,561 | 4/1976 | Shin | 501/95 X |
| 3,996,145 | 12/1976 | Hepburn | 501/95 X |
| 4,125,406 | 11/1978 | Sowman | 501/95 X |
| 4,166,147 | 8/1979 | Lange et al. | 264/204 X |
| 4,792,478 | 12/1988 | Taylor et al. | 428/221 |

FOREIGN PATENT DOCUMENTS 1360200 7/1974 United Kingdom .

OTHER PUBLICATIONS

Chemical Abstracts, vol. 102, No. 20, Abstract No. 169158t (1985); vol. 103, No. 10, Abstract No. 75149j (1985).

Primary Examiner—James Lowe
Assistant Examiner—Christopher A. Fiorilla
Attorney, Agent, or Firm—Cushman, Darby & Cushman

[57] ABSTRACT

A porous low density inorganic oxide fibre of improved strength and flexibility has at least 25% of the porosity provided by axially aligned pores. The fibres are produced by spinning into fibres a spinning solution in which is incorporated a non-ionic surface active agent having a cloud point in the solution above the fibre spinning temperature and less than 20° C. above the fibre spinning temperature, preferably within the range of 5°–15° C. above the fibre spinning temperature. The fibre may be an alumina fibre which can be free from silica and is useful as reinforcement in MMCs.

8 Claims, No Drawings

METHOD OF PRODUCING INORGANIC OXIDE FIBERS WITH AXIALLY ALIGNED POROSITY

This is a division of application Ser. No. 07/274,771 filed on Nov. 23, 1988, which was abandoned upon the filing hereof May 30, 1991.

This invention relates to inorganic oxide fibres and particularly to polycrystalline inorganic oxide fibres such as alumina fibres of low density and improved modulus and strength compared with fibres known hitherto. The invention relates also to a method for the manufacture of inorganic oxide fibres of low density by spinning a solution of an inorganic oxide precursor which is decomposable to the oxide on heating.

It is well known to produce inorganic oxide fibres by fibrizing a spinning composition comprising a solution of a soluble metal compound which decomposes on heating to yield a metal oxide. For example alumina fibres can be made by fibrizing an aqueous solution of aluminium chlorohydrate and subsequently decomposing the aluminium compound to yield alumina fibres. The spinning composition may contain a spinning aid such as an organic polymer to confer upon it the correct rheology characteristics for spinning and additives such as phase-change inhibitors, e.g. silica or metal oxide particles may be dissolved or suspended in the composition.

The production of fibres from the spinning composition may be effected by a variety of techniques, depending to some extent upon the form of the resulting fibres. The commonest form of inorganic oxide fibres, notably alumina fibre, is relatively short (e.g. 2 to 5 cm) staple fibre in the form of a mat or blanket obtained by partially drying the freshly-spun gel fibres in flight, collecting the partially dry fibres at the base of the spinning apparatus on a wire or belt and subsequently heating the fibres to dry them and convert the inorganic oxide precursor into the inorganic oxide.

Processes of the general types described above for the production of mats or blankets of randomly oriented inorganic oxide fibres are described, for example, in our United Kingdom Patent Specification No. 1,360,197 (blow spinning) and Patent Publication No. 2,096,586A (centrifugal spinning).

Inorganic oxide fibres in the form of continuous filaments have also been proposed, such fibres being obtainable for example by extruding the spinning solution continuously through an orifice and winding up the continuous fibres on e.g. a drum. The gel fibres are dried between the spinning orifice and the wind up means to an extent that they do not stick together on the wind-up apparatus. Such a process is proposed, for example, in United Kingdom Patent Specification No. 1,360,197.

In recent years considerable interest has been generated in the incorporation of inorganic oxide, e.g. alumina, fibres in metals and alloys to produce metal matrix composites of improved wear-resistance and/or high temperature performance compared with the metals or alloys alone. Notable in this respect is the development of components for the motor industry, especially pistons or parts of pistons and connecting rods. This use of the fibres has highlighted the desirability of aligned-fibre product forms of the fibres, for example to confer one-directional strength on a component i.e. much greater strength in one direction than in the transverse direction.

Also, incorporation of the fibres in metal matrix composites involves packing the fibres together to obtain high volume fractions of the fibres in the composites. Inorganic oxide fibres are hard and quite brittle and compression of a randomly-oriented mat or blanket of the fibres results in extensive breakage of the fibres. Orientation or alignment of the fibres results in less breakage of the fibres when compression is applied to obtain high volume fractions of fibres.

The most common polycrystalline inorganic oxide fibres are alumina fibres and these usually contain a small proportion, e.g. up to 5% by weight, of a phase-stabilizer such as silica. Fibres containing silica are acceptable in the reinforcement of aluminium and many aluminium alloys, but they are less suitable for the reinforcement of magnesium and alloys containing magnesium which reacts with silica during the formation of metal matrix composites. Silica-free inorganic oxide (e.g. alumina) fibres have been proposed but strong, porous, high modulus silica-free fibres have not been available hitherto.

Furthermore, although alumina fibres (containing silica) of high strength and modulus are known, it is well known that low-density, i.e. porous, forms of such fibres tend to be of lower strength and modulus.

The present invention is concerned with porous, low density fibres (silica-containing fibres and especially silica-free fibres) of improved strength and modulus and is based on the discovery that axially aligned pores in the fibre structure enhance the properties of the fibres.

According to the invention there is provided a porous, low density inorganic oxide fibre of improved strength and modulus comprising axially-aligned pores in the inorganic oxide structure and wherein at least 25% of the total porosity of the fibre is provided by axially-aligned pores.

A preferred embodiment of the invention resides in fibres according to the immediately preceding paragraph which are free from silica or other phase stabilizer. Silica-free alumina fibres are an especially preferred embodiment of the invention.

The characteristic feature of the fibres according to the invention is that at least 25% and preferably a much higher proportion than 25% of the total porosity in the fibres is provided by axially aligned pores. The term "axially-aligned pores" as used herein is not limited to pores which are oriented truly parallel to the axis of the fibre but includes some pores oriented at an angle to the axis of up to about 30 degrees. Preferably, however, the majority of the axially-aligned pores are essentially parallel to the axis and in particular are no more than 10 degrees from the axis. It is to be understood also that pores having an axially-aligned portion and a non-axially aligned portion, say a radially-aligned portion (e.g. a labyrinthine pore comprising an axial pore in communication with a radial pore), are deemed to be axially-aligned pores in respect of that portion thereof which are axially aligned. Thus the axially-aligned pores may be closed pores or they may be open to the fibre surface.

Ideally, the entire porosity of the fibre is provided by axially-aligned pores but this may not be achievable in practice. It is preferred, nevertheless, that the proportion of axially-aligned pores be as high as possible commensurate with practical considerations since in general the higher the proportion of axially-aligned pores the greater will be the strength and modulus of the resulting fibres. By way of a guide as to the improvements provided according to the the invention, we have found that an alumina fibre of 40% porosity according to the invention may be 3 or 4 times stronger and stiffer than an alumina fibre of 40% porosity in which the pores are wholly random. By way of illustration a typical alumina fibre of 40% porosity has a stiffness (modulus) of about 55 GPa if the pores are random but a stiffness of up to 200 GPa if the pores are wholly or partially axially-aligned. Similar improvements in strength have been observed.

Axial alignment of the pores in the fibres is the result of incorporating certain types of surface active agents in the spinning solution from which the fibres are spun. We have found that surface active agents of several chemical types may be employed providing that the spinning solution containing them is stable and that the cloud point of the surface active agent in the solution is above the spinning temperature but not more than 20° C. above the spinning temperature. Thus for a spinning temperature of 25° C., the cloud point of the surface active agent is below 45° C.

According to a further aspect of the invention therefore, there is provided a process for the production of porous inorganic oxide fibres having a high proportion of axially-aligned pores which comprises spinning into fibres a spinning solution comprising a solution of a compound decomposable to the inorganic oxide on heating and subsequently heating the fibres to convert the compound into the inorganic oxide, characterised in that there is incorporated in the spinning solution a non-ionic surface active agent having a cloud point in the spinning solution above the spinning temperature but not greater than 20° C. above the spinning temperature.

In a preferred embodiment the spinning temperature is about 25° C. and the surface active agent has a cloud point in the spinning solution of below 45° C.

It will be appreciated that as spinning temperature is increased, the acceptable cloud point of the surface active agent increases. For example for a spinning temperature of about 50° C. the cloud point of the surface active agent will be below 70° C.

We prefer that the cloud point of the surface active agent be at least 5° C. above the spinning temperature and not more than 15° C. above the spinning temperature. Thus, for example, for a spinning temperature of 25° C., the cloud point of the surface active agent is preferably in the range of 30° C. to 40° C.

By the term "spinning temperature" there is meant the maximum temperature which the spinning solution attains during the extrusion and draw down (extension) stages of the fibre-forming process. Thus extrusion of solution into a heated environment will result in a rise in temperature in the solution during draw down (extension) into green-fibres. The spinning temperature in such a case is the maximum temperature attained by the solution (green-fibres) before draw-down (extension) is completed. Generally the spinning temperature will be the wet bulb temperature of the attenuating air.

The "cloud point of the surface active agent" referred to herein is the temperature at which the spinning solution containing the surface active agent becomes cloudy when heated. Aqueous solutions of non-ionic surfactants become cloudy when heated, and the cloud point of these is determined by immersing a boiling tube containing about 10 mls of the solution in a cool stirred water bath, and then heating the bath at a rate of 1° C. per minute. The solution in the tube is unstirred or stirred very gently (to avoid bubbles) with a spatula. The solution becomes cloudy over a narrow temperature range within 1°-2° C., and the clouding temperature, or cloud point may then be noted. The process is reversible and when the solution is allowed to cool it becomes clear again, so that a check on the cloud point may be made by cooling the cloudy solution. In practice a single check has been found to be sufficient although in general a lower value of cloud point (up to 3° C. lower) is obtained by cooling than is obtained by heating.

As stated hereinbefore, surface active agents of several chemical types may be employed and examples of such chemical types are alkylethoxylates, alkylphenylethoxylates, polypropyleneoxide-polyethyleneoxide block copolymers, comb-type siloxane-polyethoxylate copolymers and polyethoxylated amines. It will be appreciated that within each of these chemical classes of surface active agents there may be those which have a cloud point too high to be useful in the process of the present invention as well as those which are useful in the process of the invention. It is, however, a matter of simple routine experiment to measure the cloud point of a surface active agent to determine its suitability for use in the process. Blends or mixtures of surface active agents may be employed to provide a suitable cloud point.

The amount of the surface active agent used in the spinning solution may vary within a wide range but will usually be at least 1% by weight based on the spinning solution. Preferably the amount will be from 1% to 15% by weight of the solution; we especially prefer from about 3% to about 10% by weight of the surface active agent.

The spinning solution may contain precursors of stabilising and/or sintering additives for the fibres in addition to the surface active agent. In a particular embodiment of the invention, the surface active agent may itself be a source of phase stabiliser or sintering agent in the resulting fibres. For example use of a siloxane copolymer as the surface active agent leads to the formation of silica in the fibres when the latter are heated to decompose the inorganic oxide precursor to the inorganic oxide constituting the fibres. Examples of stabilising agents of which precursors may be incorporated in the spinning solution are silica, magnesia, zirconia and yttria and mixtures thereof for alumina fibres and alumina, magnesia and yttria for zirconia fibres.

Axial alignment of at least some of the pores in the fibres according to the invention is demonstrated by a difference in refractive index between the axial direction, $n_a$ and the radial direction, $n_r$ of the fibres. Values for $n_a - n_r$ of up to 0.03 have been observed for eta-alumina fibres of 40% porosity. Such fibres exhibit positive uniaxial optical double refraction, known as form birefringence, and there is a direct relationship between microscopically measured double refraction and the stiffness and strength of such fibres. In general, the greater the measured double refraction ($n_a - n_r$), the greater the axial alignment of the porosity in the fibres.

Double refraction in fibres having diameters below about 10 microns has to be measured using a polarising microscope and a calibrated compensator such as a Senarmont type compensator. Viewing the fibres dry between crossed polarisers, the path difference can be calculated from the measured rotation $\theta°$ of the analyser to give maximum darkness in the centre of the fibre. The refractive index difference is then simply path difference ($=\theta\lambda \div 180$) divided by fibre diameter. For white light, $\lambda=0.55$ micron.

The measurement of double refraction or form birefringence is described by Hartshorne and Stewart in "Crystals and the Polarising Microscope" (London, Edward Arnold, 4th Edition 1970). The mathematical theory was developed by Wiener as described in Abh. Sachs. Ges. (Akad) Wiss., 1912, 32, 507 and by J. R. Partington in Advanced Treaty on Physical Chemistry, Vol 4, Physico-Chemical Optics, p275, published by Longmans. The theory was further extended by Hermans in "Contributions to the Physics of Cellulose Fibres" (Monographs on the Progress of Research in Holland during the War, Vol 3 132, Elsevier, Amsterdam 1946). The above double refraction method is applicable to randomly oriented fibres and to aligned fibres. Wiener's theory enables us to calculate a theoretical form birefringence which, for example, for eta alumina of refractive index 1.6 and 40% of perfectly axially-aligned porosity is about 0.04. The ratio of achieved/theoretical birefringence gives a quantitative measure of the fraction of aligned pores in the fibres and is easy to determine.

The above double refraction method for determining pore alignment is applicable to randomly oriented fibres and to aligned fibres. A further method is available for assessing pore alignment in the case of aligned fibres. This is small angle neutron scattering in which about 0.2g of a tow of aligned fibres is exposed to a monochromatic thermal neutron beam and the small angle scattering onto an area detector is recorded. When the pores in the fibres are axially aligned, scattering normal to the fibre axis is more intense than in the direction parallel to the axis. It is possible to relate the anisotropy of the scattering intensity to the axial alignment of pores and hence the average mechanical properties of the fibres.

The fibres may be short (staple) fibres, continuous fibres or fibres of intermediate length from say 0.5 meters up to say a few meters (nominally-continuous fibres). Thus, for example the fibres may be produced in the form of a blanket of randomly-oriented short (staple) fibres or a sheet or tow of aligned or essentially-aligned fibres. A preferred product is one in which the individual fibres are essentially aligned and have appreciable length and whilst not truly continuous are nominally continuous.

By the term "essentially-aligned" as used throughout this specification in relation to fibres is meant a product form in which the fibres extend in the same general direction but may not be truly parallel over their entire length so that a degree of overlap of fibres is possible and any particular fibre may extend over part of or even its entire length at an angle, e.g. up to 30° or even higher, with respect to the general direction of alignment of the fibres. In such a product the overall impression is of fibres which are parallel but in fact a slight degree of overlap and intertwining of fibres occurs and indeed is desirable in order to confer lateral stability on the product to enable it to be handled without undue separation of the fibres. We prefer that at least 90% of the fibres be essentially parallel.

By the term "nominally continuous fibres" there is meant fibres which may not be truly continuous in the sense of having infinite length or of extending the entire length of the product but each fibre has appreciable length, e.g. at least 0.5 meter and usually several meters, such that the overall impression in the product is of continuous fibres. Thus free ends of fibres may appear in the product, representing an interruption in fibre continuity, but in general the number of free ends in any square cm of the product will be relatively low and the proportion of interrupted fibres in a square cm will be no greater than about 1 in 100.

One product according to the invention comprising nominally-continuous fibres is a mat or blanket of thickness a few mms. In a product of this thickness the number of free ends of fibre in a square cm of the product may be up to about 2,500; this compares with about 50,000 free ends in a product of similar mass made of short (up to 5 cms) staple fibres of the same diameter. The product made of nominally continuous fibres is thus very different in appearance and properties from a product made of short, staple fibres. Other product forms include spools of fibre tows.

Preferably the lateral cohesion in the essentially-aligned, nominally-continuous fibre product, resulting from fibres disposed at an angle to the general direction of alignment of the fibres, is such that the product exhibits a tensile strength of at least 25,000 Pa in a direction perpendicular to the general direction of alignment of the fibres. The lateral strength of the product will depend to some extent upon the diameter of the fibres since given the same degree of entanglement, fatter fibres will in theory produce a greater lateral strength than will thinner fibres; in fact fatter fibres tend to be less entangled than thinner fibres so that in practice fatter fibres tend to result in lower lateral strengths in the product.

The fibres according to the invention are polycrystalline metal oxide fibres, for example alumina fibres and zirconia fibres, and preferably are alumina fibres. In the case of alumina fibres, they may comprise alpha-alumina or a transition phase of alumina, notably gamma- or delta-alumina. Typically the fibres will consist essentially of a transition alumina or a minor proportion of alpha-alumina embedded in a matrix of a transition alumina such as gamma- or delta-alumina. We prefer fibres comprising zero or a low alpha-alumina content and in particular an alpha-alumina content of below 20% by weight and especially below 10% by weight. In general for silica-stabilised alumina the greater the alpha-alumina content of the fibres, the lower is its tensile strength and the lower is its flexibility. The preferred fibres of the invention exhibit acceptable tensile strengths and have a high flexibility.

The diameter of the fibres may be from a few, say 2, microns to several hundred microns; we prefer fine-diameter fibres of diameter below about 20 microns, in particular below about 10 microns. One especially preferred product is one in which the fibres are of mean diameter about 3 microns.

The density of the fibres is largely dependent upon the heat treatment to which the fibres have been subjected and the presence or absence of a phase-stabiliser in the fibres. After spinning and at least partial drying, the gel fibres are usually heated in steam at a temperature of from 200° C. to about 600° C. to decompose the metal oxide precursor, further heated to burn out any organic residues and to crystallise the resulting metal oxide fibres, and then optionally even further heated to sinter the fibres. Crystallisation temperatures of 1,000° C. or higher may be employed. After the steam treatment the fibres are highly porous and high porosity is retained during crystallisation up to, for example, 900°–950° C. However, after sintering silica-containing alumina fibres at for example above 1,200° C., e.g. up to 1,350° C. or higher, the fibres have little porosity. Thus by controlling the sintering temperature and amount of phase-stabiliser present, low density fibres of high porosity may be obtained. Typical apparent densities for low density alumina fibres are 1.75 to 2.0 g/ml. Typical low apparent densities of zirconia fibres are about 4.0 g/ml.

We have observed that the modulus of some silica-stabilised alumina fibres does not appear to be greatly affected by sintering the fibres at above 1,000° C. and does not vary greatly in accordance with the apparent density of the fibres. For instance, over the range of apparent fibre densities of 2 g/ml to 3.3 g/ml, the modulus of such alumina fibres has been observed to change only from about 170-230 GPa to about 240-300 Gpa. Thus the ratio of fibre modulus to fibre density (=specific modulus) is generally greatest in respect of low density fibres.

The fibres may be produced by any of the known techniques of fibre formation. For example, short (staple) fibres can be produced by a blow spinning technique or a centrifugal spinning technique as also can nominally-continuous fibres. Continuous fibres can be produced by the conventional extrusion/wind-up technique. However in producing the aligned pore fibres of the invention, control must be exercised over the conditions to ensure that the solution jets remain sufficiently fluid for a long enough period to permit creation of the proper gel-fibre structure. This is not usually a problem in the case of short fibres and nominally-continuous fibres where a relatively low viscosity spinning solution is employed but can be a serious problem in the case of larger diameter continuous fibres where a higher viscosity spinning solution is employed. In the case of continuous fibres, conditions need to be controlled to prevent premature drying and skinning of their surface when the fibres are being drawn, for example by spinning the fibres into a moist, non-drying environment.

The aligned pore structure of the fibres is created by proper structuring within the gel fibres, that is the green fibres formed prior to heat treatment to convert the oxide precursor into the desired inorganic oxide of the fibres. Particular spinning conditions are needed to generate the desired structure in the gel fibres. Staple spinning processes draw the fibres rapidly to a fine diameter and in consequence the viscosity of the spinning solution increases rapidly and uniformly across the fibre cross-section whilst the gel fibre is being drawn and subjected to extensional stresses. The combination of rapidly increasing viscosity and high spin/draw ratio provides flow forces of sufficient intensity and duration to create the desired gel fibre structure. Blow spinning operated under the right conditions offers overall spin/-draw ratio of from 500 to 2,500, where overall spin/-draw ratio is the ratio between the velocity of the gel fibres and the velocity of the spinning solution in the spinerette holes.

As stated above, fibres can be produced by a blow-spinning technique or a centrifugal spinning technique, in both cases a spinning formulation being formed into a multiplicity of fibre precursor streams which are dried at least partially in flight to yield gel fibres which are then collected on a suitable device such as a wire screen in the case of the short (staple) fibre or a wind up drum rotating at high speed in the case of nominally-continuous fibres.

For producing a product comprising nominally-continuous fibres, we prefer to use a blow-spinning technique in which the spinning formulation is extruded into a multiplicity of fibre precursor streams which are entrained in air streams and passed through a converging duct to a wind-up drum. Preferably the spinning formulation is extruded into converging streams of air of relative humidity greater than 70%. The speed of rotation of the wind-up drum will depend upon the diameter of the drum and is matched to the speed of spinning of the fibres so that undue tension is not applied to the weak gel fibres. As a guide only, a wind-up drum speed of 1,500 rpm is fairly typical for a drum of diameter 15 cms. In practice it may be desirable to wind the wind-up drum slightly faster than the speed of extrusion of the fibres such that the fibres are subjected to slight tension which serves to draw down the fibres to the desired diameter and to keep the fibres straight. Of course, the applied tension should not be sufficient to break the majority of the fibres.

As stated hereinbefore, the fibres may not be truly continuous and generally are of length 0.5 to about 2 meters. The minimum fibre length in the case of collection on a wind-up drum is approximately equal to the circumference of the wind-up drum since fibres which are shorter than this tend to be flung off the rotating drum. Because the fibres are not of infinite length it is important that a multiplicity of fibres be spun simultaneously so that the resulting collection of fibres pass through the apparatus in a bundle or sheet whereby free ends of fibres are carried along by the bundle or sheet of fibres which gives an overall impression of fibre-continuity.

The spinning formulation may be any of those known in the art for producing polycrystalline metal oxide fibres and preferably is a spinning solution free or essentially free from suspended solid or gel particles of size greater than 10 microns. Preferably the solution is free from particles of size greater than 5 microns. The rheology characteristics of the spinning formulation can be readily adjusted to result in long fibres rather than short fibres, for example by use of spinning aids such as organic polymers or by varying the concentration and molecular weight of fibre-forming components in the formulation.

The fibre product of the invention can be a sheet or mat (as described hereinbefore) comprising essentially-aligned and nominally-continuous fibres exhibiting lateral cohesion as a result of entanglement of some of the fibres. A typical product of this type is a sheet or mat of thickness a few, say 2-5 mms, width several cms and length a meter or more, obtained by collecting the fibres on a wind-up drum and cutting the collected fibres parallel to the axis of the wind-up drum (the length and width of the sheet or mat thus being determined by the dimensions of the wind-up drum). Other product forms such as yarns, rovings, tapes and ribbons can be obtained either from the product collected on a wind-up drum or directly by using a suitable fibre-collection technique. In the case of a product collected on a wind-up drum, the product can be cut spirally in the general direction of alignment of the fibres to provide tapes or ribbons which can be drawn off from the drum and converted if desired into yarns or rovings.

The fibre product in the form of yarns, rovings, tapes or ribbons can be converted into woven products using suitable weaving techniques. Woven product forms of the fibres may be an especially useful form of the fibres for incorporation as the reinforcement for metals in metal matrix composites and products in the form of woven material are provided according to a feature of the invention.

The fibre products may be used in any of the applications in which alumina fibres are commonly employed, for example as thermal and acoustic insulating materials and as the reinforcement for metal matrix composites.

The invention is illustrated by the following examples in which the fibres were spun and treated by the following general procedure:

Fibre-formation

The spinning solution was extruded through a row of holes of diameter 225 microns or 300 microns and the emerging precursor fibres were attenuated by streams of humid air flowing from slits on either side of the row of holes and converging at an included angle of 60° C. Streams of dry heated air flowed outside the streams of humid air. Long (nominally continuous) precursor fibres, gelled by the warm air, were formed and these were fed together with the air streams into and through a converging duct. The gel fibres emerging from the duct were collected on a rotating drum. After a period of typically 30 minutes the drum was stopped and the aligned fibre blanket collected on it was cut parallel to the axis of the drum and removed.

The fibre blanket removed from the drum was heated to 200° C. in an air stream in a furnace for 1 hour. The atmosphere was then changed to superheated steam (3.3g/min flow rate) and the furnace temperature was raised to 500° C. during a period of 2 hours. After this time the atmosphere was changed back to air and the furnace temperature was raised to 900° C. over a period of 1 hour and held at 900° C. for a further 30 minutes. The fibres were then cooled to room temperature for examination.

EXAMPLE 1

A spinning solution was prepared at ambient temperature (24°-26° C.) in the following manner. 0.25gm of thiourea was dissolved in 3,000 gms. of commercial aluminium chlorhydrate solution. (Locron S from Hoechst AG) The solution was stirred with a propeller stirrer rotating at 250 rpm, and 25 gm of polyethylene oxide (Union Carbide Polyox WSR-N-3000) dissolved over 3 hours. 950 gm of aluminium chlorhydrate flake (Locron P) was added and dissolved over a further two hours, followed by 209 grams of a siloxane surfactant (ICI EP 6486), whose cloud point in the spinning solution was 35° C. The viscosity at this stage, measured at 1,000 sec$^{-1}$ and 25° C. was 42 poise. The viscosity was adjusted by adding 80 mls distilled water and a further 30 gm of flake and the final spinning solution viscosity was 27 poise. Before spinning the solution was filtered through a polypropylene fibre filter. (Domnick Hunter Ltd. "Peplon" Type, 5 micron.)

The spinning solution was spun into fibres by the foregoing general procedure for fibre formation (under 'Fibre-formation') using the following conditions:
Spinning temperature—29.4° C.
Humid air
    relative humidity 88% at 31° C.
    velocity 57.5 m/sec
Dry air—at temperature of 76° C.
Air stream emerging from duct—26 m/sec
Collecting drum
    hollow and covered with perforated metal sheet
    diameter 450 cm
    rotated at 475 r.p.m.

The mean diameter of the green fibres (i.e. prior to the heat treatment) was 7 microns; the spread of fibre diameter was from 5 microns to 10 microns.

After the heat treatment, the mean diameter of the fibres was 3.9±0.4 microns. They were found to be positively uniaxial in polarised light and the mean refractive index difference $(n_a - n_r)$ was 0.0178± 0.003. This indicates that about 45% of the fibre porosity is provided by axially aligned pores.

Tests on single fibres (19 fibres) determined a mean stiffness (modulus) of 103±26 GPa and a mean strength of 779±280 MPa. The fibres had a surface area of 85m$^2$/g and a porosity of 30%; the apparent density was 2.06 g/ml.

EXAMPLE 2

0.1 gm thiourea was dissolved in 600gm of commercial aluminium chlorhydrate solution. (Hoechst Locron S). 5.75gm polyethylene oxide (Union Carbide Polyox WSR-N-750) and 150gm of chlorhydrate flake were then dissolved under the conditions of Example 1. 41.8 gm of a siloxane mixture consisting of 3 parts of ICI EP6486 and 1 part DC193 was added and the batch completed by further blending for a period of 1 hour. The surfactant cloud point in the spinning solution was 37.5° C.

The solution viscosity measured with an Ubbelhode suspended level viscometer was 16.5 poise at 25° C. and prior to spinning it was filtered through a GF/B glass fibre filter.

The solution was spun into fibres by the foregoing general fibre-forming procedure (under 'Fibre-formation') using the following conditions:
Spinning temperature—26.5° C.
Humid air
    88% relative humidity at 28° C.
    velocity 73m/sec
Dry air—at 76° C.
Air stream emerging from duct—at 16m/sec
Collecting drum
    diameter 6 inches non-porous and coated with fine emery paper
    rotated at 1,000 r.p.m.

The mean diameter of the green fibres (before heat treatment) was 4.75 microns. After heat treatment the mean diameter of the fibres was 3.1±0.9 microns.

The fibres had a BET surface surface area of 125m$^2$/g and a porosity of 34%; their apparent density was 2.12 g/ml. The fibres were strongly double refracting and when examined by small angle neutron scattering gave a strongly anisotropic scattering pattern below $Q=0.1A^{-1}$, indicating that more than 60% of the pores were axially-aligned.

In tests on single fibres, the mean stiffness (modulus) of the fibres was 216±72 GPa and their mean strength was 1,650±580 MPa.

EXAMPLE 3

A spinning solution was prepared as follows: 0.25 gm thiourea was dissolved in 2,500 gm Locron S aluminium chlorhydrate solution 18.3 gm polyethylene oxide (Polyox WSR-N-3000) was then added and dissolved over 3 hours using a slow moving propeller stirrer. 555 gm of aluminium chlorhydrate flake was then dissolved over two hours. At this stage the solution viscosity, measured with an Ubbelhode viscometer at 25° C., was 18 poise. The viscosity was adjusted to 14 poise by blending in 20 mls of distilled water. 700 gm of the mixture The fibres were slightly double refracting with a refractive index difference of 0.01±0.003; about 25-30% of the pores were axially aligned.

COMPARATIVE EXAMPLE 8

A spinning solution was prepared as follows: 0.1 gm of thiourea was dissolved in 600 gms of commercial aluminium chlorhydrate solution (Locron S). The solution was stirred with a propeller stirrer at 24° C. and 4.4 gm of polyethylene oxide (Polyox WSR-N-3000) added. The polymer was dissolved over a period of three hours. 160 gm of aluminum chlorhydrate powder were then added and the solution mixed for a further two hours to dissolve the powder. 41.5 gms of a siloxane surfactant (Dow DC 193) was then added. The solution was filtered through four layers of a nylon filter cloth rated at 0.5 micron sieve size. (Plastok Associates Ltd Birkenhead) The solution viscosity, measured at 25° C. with an Ubbelhode suspended level viscometer was 14.3 poise and the surfactant cloud point 50° C. The solution was spun into fibres by the general procedure using the following conditions:

Spinning temperature—21.25° C.
Humid air
    88% relative humidity at 22.6° C.
    velocity 60 m/sec
Dry air—at 60° C.
Air emerging from duct—at 30 m/sec
Collecting drum
    hollow drum covered with perforated metal sheet
    18 inches diameter
    rotating at 500 r.p.m.

The mean diameter of the green fibres was 6.1 microns with a spread of diameters from 4 microns to 8 microns.

After heat treatment, the fibres were found to be of 42% porosity and BET surface area 143 $m^2/g$. The mean pore diameter was 6.2 nm and the mean fibre diameter was 4.76±0.8 microns.

When examined under a polarising microscope, the fibres were optically inactive, indicating the essential absence of axially-aligned pores in the fibres. Single fibre tests (21 fibres) determined a mean stiffness (modulus) of only 58±9 GPa and a mean strength of 612±121 MPa.

COMPARATIVE EXAMPLE 9

A spinning solution was prepared and spun into fibres as described in Example 4 except that the surface active agent was omitted from the spinning solution.

The mean diameter of the green fibres was 4.5 microns.

After heat treatment, the fibres had a BET surface area of 139 $m^2/g$, a porosity of 29% and an apparent density of 2.08 g/ml.

The SANS pattern was isotropic, indicating random pores only in the fibres.

COMPARATIVE EXAMPLE 10

A spinning solution was prepared and spun into fibres as described in Example 8 except that the siloxane was replaced with an equal amount of surfactant Synperonic NP-20. The solution cloud point was 55° C. The mean diameter of the gel fibre was 3.5 microns.

The fired fibres had a mean diameter 2.8 microns and were optically isotropic. The SANS was almost isotropic but scattered slightly more strongly in the direction parallel to the fibres. Other properties were:
BET Surface Area—160 $m^2/g$
Apparent Density—1.78 g/ml
Porosity—45%

COMPARATIVE EXAMPLE 11

Example 10 was repeated using the cationic surfactant Arquad C-33W instead of Synperonic NP-20. The cloud point of the solution was 70° C. The mean diameter of the gel fibre was 5.5 microns with a spread between 4 and 8.5 microns. The fired product had a porosity of 50%, an apparent density 1.57 g/ml, and a BET surface area of 149 $m^2/g$. The fibres were optically isotropic and SANS also indicated a random pore system.

EXAMPLE 12

A solution was prepared using the method described in Example 2. The solution was spun in a centrifugal spinning apparatus, in which fibres were generated by detaching the spinning solution in streams of regularly spaced ligaments from the lip of a rapidly rotating metal cup.

The cup was 70 mm in diameter and 10 mm deep, with the open end partially closed by a flat circular plate 85 mm in diameter. The cup was driven by a variable speed electric motor and spinning solution could be fed through the drive shaft to the base of the cup.

Humid air was fed to an annular ring 150 mm in diameter around the cup and hot dry air was fed to an outer annular ring of outer diameter 225 mm. The cup and the air feed rings were located in the top of a cylindrical chamber which was open at the base. The chamber was 912 mm in diameter and 1,000 mm deep, and a deep muslin bag was clipped across the base to filter the mixture of air and fibre leaving the chamber.

The cup was rotated at 8,800 RPM and 80 m/,hr of humidified air (25° C. and 80% relative humidity) was fed to the inner ring, and 170 $m^3/hr$ of heated ambient air at 80° was fed to the outer ring. Spinning solution was fed to the interior of the cup at 22.5 ml/min. Fibres were generated at the rim of the cup and collected as a random fleece in the muslin bag at the base of the spinning chamber.

The gel fibres were of mean diameter 5.8 microns with a spread from 2.5 to 12.5 microns. The mean diameter fell to 3.6 microns after heat treatment and the product was strongly double refracting, thereby showing the development of an aligned pore system.

EXAMPLE 13

A spinning solution was prepared in the following manner. 0.5 gm of thiourea was dissolved in 250 mls of distilled water. 5 gm of WSR-N-3000 polyox was then added and dispersed for 2 minutes with a 5 cm propeller running at 500 RPM, and then dissolved at 200 RPM for 3 hours at ambient temperature. The solution was filtered under pressure through GF/B filters and adjusted to pH 3 with a drop of dilute hydrochloric acid. 127.5 gm of the polyox solution was then blended with 500 gm of aluminium chlorhydrate solution (Hoechst Locron S) and the mixture again filtered through a single GF/B filter. The solution was carefully evaporated in a Buchi rotary evaporator, with the water bath at 40° C. boiling and skinning being avoided. Samples of solution were withdrawn and the viscosity measured in a 3 ml phial using a Viscometers UK RV4 Viscometer with a No 6 spindle rotating at 50 RPM, the unusual configuration having been checked by measuring the viscosity of glycerol. Evaporation was stopped when 242 gm of was taken and 37 gm of a nonyl phenyl ethylene oxide condensate surfactant (Synperonic NP-10) were added and blended for one hour. The final viscosity of this solution was 17.8 poise and the surfactant cloud point 30° C. Spinning was undertaken after filtration through a GF/B filter.

The solution was spun into fibres by the foregoing general fibre-forming procedure (under 'Fibre-formation') using the following conditions:
Spinning temperature—22.8° C.
Humid air
    91% relative humidity at 23.6° C.
    velocity 48m/sec
Dry air—at 61° C.
Air stream emerging from duct—at 14.6 m/sec
Collecting drum
    6 inches diameter non-porous and coated with fine emery paper
    rotated at 1,250 r.p.m.

The mean fibre diameter of the green fibres was 5.2 microns with a spread of diameters between 3.5 microns and microns.

After heat treatment the mean diameter of the fibres was measured as 2.6±0.4 microns. BET surface area was 105 m$^2$/g, porosity 31% and apparent density 2.18 g/ml. The mean modulus of the fibres was 151±50 GPa and the mean strength 1,490±600 MPa. The fibres were strongly double refracting with a refractive index difference of 0.0216±0.007 and SANS on an aligned fibre tow showed strongly scattering peaks normal to the fibre direction. The intensity normal to the fibres was three times greater than that parallel at Q=0.05 A$^{-1}$, indicating a highly anisotropic pore system. These results indicate that about 70% of the pores in the fibres were axially-aligned.

EXAMPLE 4

A spinning solution was prepared as described in Example 2 except that 41.7 gm of surfactant Synperonic A9, an aliphatic hydrocarbon ethylene oxide condensate was used instead of the siloxane. The cloud point of the surfactant in the solution was 31° C. The solution was spun into fibre essentially as described. The mean diameter of the gel fibres was 4 microns with a spread from 2.5 to 5.5 microns.

The fibres were fired under standard conditions to 900° C., after which the following properties were measured:
Spinning temperature—22.8° C.
Mean diameter—2.5±0.3 microns
Mean Young's Modulus—116±26 GPa
Mean Tensile Strength—1,120±330 MPa
BET surface area—123 m$^2$/g
Apparent Density—2.25 g/ml
Porosity—31%

The fibres were strongly double refracting with a refractive index difference of 0.019±0.0062, indicating that about 50% of the fibre porosity was in the form of axially aligned pores.

EXAMPLE 5

A spinning solution was prepared as described in Example 4 except that 41.7 gm of the surface active agent Synperonic PE/L64 was used instead of Synperonic A9. Surfactant cloud point was 31° C. The solution was spun into fibres as described in Example 4, at a spinning temperature of 22.8° C.

The firing procedure of Example 4 was repeated and the following properties measured:
Mean diameter —2.8±0.6 microns
Mean Young's Modulus—121±29 GPa
Mean Tensile Strength—1,024±300 MPa
BET surface area—139 m$^2$/g
Apparent Density—1.9 g/ml
Porosity—40%

The fibres were strongly double refracting with a refractive index difference of 0.02±0.002; about 50% of the pores were axially aligned.

EXAMPLE 6

A solution was prepared as described in Example 3 using the same ingredients except that 5.5 gm of magnesium chloride hexahydrate crystals were dissolved before the addition of the polyethylene oxide. The surfactant cloud point in the solution was 30° C. The solution was spun using the standard procedure under the following conditions:
Spinning temperature—29.7° C.
Humid air
    88% relative humidity at 32.4° C.
    velocity 60 m/sec
Dry air—at 81° C.
Air emerging from duct—at 25.5 m/sec
Collecting drum
    hollow drum covered with perforated metal sheet
    18 inches diameter
    rotating at 420 r.p.m.

Gel fibres of mean diameter 6 microns with a spread from 4.5 to 9 microns were produced.

The gel fibres were fired and the following properties observed:
Mean diameter—3.5±0.3 microns
Mean Young's Modulus—80±12 GPa
Mean Tensile Strength—780±170 MPA
BET surface area 114 m$^2$/g
Apparent Density—1.98 g/ml
Porosity—37%

The fibres were double refracting with a refractive index difference of 0.016±0.0028; about 40% of the pores were axially-aligned.

The relatively low results for modulus an strength show that a cloud point very close to the spinning temperature is not the optimum condition.

After heating to 1,150° C. for 30 minutes the fibres were converted to mainly alpha alumina with an increased refractive index difference. The BET surface area was 8 m$^2$/g, porosity 25% and apparent density 2.85 g/ml. The refractive index difference for this alpha-aluminium fibre was 0.07. The mean modulus had increased to about 120 GPa.

EXAMPLE 7

The solution preparation, spinning and firing procedures followed Example 6, except that the magnesium chloride was replaced by 38.6 gm of yttrium nitrate hexahydrate. The surfactant cloud point in the solution was 22° C. and the fired fibres had the following properties:
Mean diameter—4.9±0.7 microns
BET surface area—95 m$^2$/g
Apparent density—2.13 g/ml
Porosity—33%
Modulus—65±16 GPa
Strength—563±200 MPa water had been removed and the solution viscosity was 250 poise.

The solution was then cooled to 20°-25° C. and 25 mls of a filtered degassed mixture of siloxane EP 6486 (3 parts) and DC193 (1 part) added. The siloxane mixture and solution were blended under vacuum by alternately running the Buchi at high speed for one minute, to thin out the films of surfactant and solution then slowing down for five minutes to allow the mixture to fold together. After 30 minutes a bubble free solution was produced of viscosity 1860 poise suitable for continuous spinning. The solution was extruded at 45 ml/hr through eight 90 micron spinning holes into a three stage spinning column, comprising:
(i) a drawing stage 150 mm in diameter and 400 mm long purged at 10 l/min, with humid air controlled to 88-92% relative humidity at 25° C.
(ii) and intermediate stage open to the laboratory atmosphere at 24° C., 500 mm long.
(iii) a drying stage 150 mm in diameter and 1,000 mm long purged with dry air at 40° C.

Fibres were formed and wound up on a 150 mm bobbin at a peripheral speed of 220 m/min. Gel fibre was rewound from the bobbin and a skein fired in an oven. The fired fibres were of uniform diameter 14 microns and strongly birefringent, indicating axially-aligned pores.

We claim:

1. A process for the production of porous low density inorganic oxide fibres having a high proportion of axially-aligned pores in the inorganic oxide structure which comprises spinning into fibres a spinning solution comprising a solution of a compound decomposable to the inorganic oxide on heating and subsequently heating the fibres to convert the compound into the inorganic oxide, characterised in that there is incorporated in the spinning solution a non-ionic surface active agent having a cloud point in the spinning solution above the spinning temperature but not greater than 20° C. above the spinning temperature.

2. A process as claimed in claim 1 wherein the surface active agent has a cloud point in the spinning solution of at least 5° C. above the spinning temperature.

3. A process as claimed in claim 1 wherein the surface active agent has a cloud point in the spinning solution of not more than 15° C. above the spinning temperature.

4. A process as claimed in claim 1 wherein the spinning temperature is about 25° C. and the surface active agent has a cloud point in the spinning solution of below 45° C.

5. A process as claimed in claim 1 wherein the spinning temperature is about 50° C. and the surface active agent has a cloud point in the spinning solution of below 70° C.

6. A process as claimed in claim 1 wherein the amount of the surface active agent is at least 1% by weight of the spinning solution.

7. A process as claimed in claim 6 wherein the amount of surface active agent is from 1% to 15% by weight of the spinning solution.

8. A process as claimed in claim 1 wherein the spinning solution is spun into fibres by a blow-spinning technique.

* * * * *